United States Patent
Fenney

(10) Patent No.: US 10,437,726 B2
(45) Date of Patent: Oct. 8, 2019

(54) NON-LINEAR CACHE LOGIC

(71) Applicant: Imagination Technologies Limited, Kings Langley (GB)

(72) Inventor: Simon Fenney, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 378 days.

(21) Appl. No.: 15/461,750

(22) Filed: Mar. 17, 2017

(65) Prior Publication Data

US 2017/0270046 A1    Sep. 21, 2017

(30) Foreign Application Priority Data

Mar. 18, 2016 (GB) .................................. 1604670.8

(51) Int. Cl.
*G06F 12/00* (2006.01)
*G06F 12/0864* (2016.01)
(Continued)

(52) U.S. Cl.
CPC .......... *G06F 12/0864* (2013.01); *G06F 12/10* (2013.01); *G06F 12/1408* (2013.01);
(Continued)

(58) Field of Classification Search
CPC .. G06F 12/0864; G06F 12/10; G06F 12/1408; G06F 2212/1016; G06F 2212/1021; G06F 2212/1024; G06F 2212/1052; G06F 2212/604; G06F 2212/608
See application file for complete search history.

(56) References Cited

U.S. PATENT DOCUMENTS 7,543,132 B1 * 6/2009 Grohoski ............ G06F 12/1027
                                                    711/150
7,606,994 B1    10/2009 Cypher
(Continued)

OTHER PUBLICATIONS

Anonymous: "Bit Strings"; MIT Scheme Reference, Sep. 14, 2010; Retrieved from the Internet: URL:https://web.archive.org/web/20100914012516/https://groups.csail.mit.edu/mac/ftpdir/scheme-7.4/doc-html/scheme_10.html [retrieved on Apr. 20, 2018].
(Continued)

*Primary Examiner* — Prasith Thammavong
(74) *Attorney, Agent, or Firm* — Vorys, Sater, Seymour and Pease LLP; Vincent M DeLuca

(57) ABSTRACT

Cache logic for generating a cache address from a binary memory address comprising a first binary sequence of a first predefined length and a second binary sequence of a second predefined length, the cache logic comprising: a plurality of substitution units each configured to receive a respective allocation of bits of the first binary sequence and to replace its allocated bits with a corresponding substitute bit string selected in dependence on the received allocation of bits; a mapping unit configured to combine the substitute bit strings output by the substitution units so as to form one or more binary strings of the second predefined length; and combination logic arranged to combine the one or more binary strings with the second binary sequence by a reversible operation so as to form a binary output string for use as at least part of a cache address in a cache memory.

20 Claims, 4 Drawing Sheets

(51) Int. Cl.
G06F 12/10 (2016.01)
G06F 12/14 (2006.01)
(52) U.S. Cl.
CPC ........... G06F 2212/1016 (2013.01); G06F 2212/1021 (2013.01); G06F 2212/1024 (2013.01); G06F 2212/1052 (2013.01); G06F 2212/604 (2013.01); G06F 2212/608 (2013.01)

(56) References Cited

U.S. PATENT DOCUMENTS

| | | | |
|---|---|---|---|
| 8,036,379 B2* | 10/2011 | Ferguson | G06F 9/30029 380/277 |
| 2003/0182448 A1 | 9/2003 | Gooch et al. | |
| 2004/0210696 A1 | 10/2004 | Meyer et al. | |
| 2005/0138321 A1 | 6/2005 | Jourdan et al. | |
| 2008/0162869 A1 | 7/2008 | Kim et al. | |
| 2009/0132784 A1 | 5/2009 | Lee et al. | |
| 2012/0198121 A1 | 8/2012 | Bell et al. | |
| 2012/0268471 A1* | 10/2012 | Khalvati | G06T 1/60 345/522 |
| 2013/0042215 A1 | 2/2013 | Tian et al. | |
| 2013/0268822 A1* | 10/2013 | Manoochehri | H03M 13/29 714/758 |
| 2014/0082284 A1 | 3/2014 | Ferrer et al. | |
| 2017/0126738 A1* | 5/2017 | Wilkerson | G06F 21/52 |
| 2018/0357180 A1* | 12/2018 | Grant | G06F 12/0895 |

OTHER PUBLICATIONS

Noriaki et al; "Coordinated Bank and Cache Coloring for Temporal Protection of Memory Accesses"; 2013 IEEE 16th International Conference on Computational Science and Engineering; Dec. 3, 2013; pp. 685-692.
Bellare et al; "Collision-Resistant Hashing: Towards Making UOWHFs Practical" International Association for Cryptologic Research; Aug. 26, 2000; pp. 1-32.
Anonymous; "Lookup Table"; Wikipedia, the free encyclopedia; Jun. 21, 2014; Retrieved from the Internet: URL:http://web.archive.org/web/20140621081859/http://en.wikipedia.org/wiki/Lookup_table; pp. 1-5.
Daemen; "Hash Function and Cipher Design: Strategies Based on Linear and Differential Cryptanalysis"; Mar. 2, 1995; Retrieved from the Internet: URL:http://jda.noekeon.org/JDA_Thesis_1995.pdf; 267 pages.
Hill et al., "Evaluating Associativity in CPU Caches," IEEE Transactions on Computers, vol. 38, No. 12, Dec. 1989, pp. 1612-1630.
Hennessy et al., "Computer Architecture: A Quantitative Approach," Fifth Edition, pp. 72-96, Elsevier Inc., Waltham, MA, 2012.
Schlansker et al., "Randomization and Associativity in the Design of Placement-Insensitive Caches," Hewlett-Packard Company, 1993.
Seznec, "A case for two-way skewed-associative caches," Proceedings of the 20th International Symposium on Computer Architecture, San Diego, CA. May 1993.
Smith, "Cache Memories," Computing Surveys, vol. 14, No. 3, Sep. 1982.
Vandierendonck et al., "Trade-offs for Skewed-Associative Caches," Advances in Parallel Computing, vol. 13, 2004, pp. 467-474.

* cited by examiner

NON-LINEAR CACHE LOGIC

BACKGROUND OF THE INVENTION

This invention relates to cache logic for generating a cache address, to a cache memory system and to a method for generating a cache address.

Cache memories are widely used as part of a memory hierarchy to increase the performance of data processing systems by reducing the latency associated with main memory accesses and/or the bandwidth consumed by those accesses. As described in Hennessy and Patterson's "*Computer Architecture. A Quantitative Approach. (Fifth Edition)*", Section 2.1, the principal of locality, both temporal and spatial, means that storing some subset of the previously accessed (e.g. the most recently accessed) data in a relatively small cache memory, that is capable of being accessed with a lower latency and/or higher bandwidth than the main memory (in which the original data is stored), permits a cost effective means of achieving faster performance of the overall memory system.

In order to ensure that cached data can be readily retrieved from the cache memory, the cached data must be organised according to a defined scheme. Following the nomenclature of Hennessy and Patterson, we define clines' (AKA 'blocks') to be a predefined number of one or more words of memory on aligned boundaries. Hennessy and Patterson note that the most popular scheme is "set associative" whereby "set" is a group of physical storage lines in the cache. A line in memory is first mapped onto a set and then that line can be placed in any one of that set's lines. Further, in Hennessy and Patterson, the set is chosen with the trivial (for powers of 2) mapping Chosen_set=(Line Address)MOD(Number of sets in cache).

When there are n lines in a set, the cache scheme is referred to as 'n-way set associative'. The logical extremes have particular names: the case where n=1 is referred to as a "direct-mapped" cache. This is the least expensive to implement but has relatively low performance. (Some factors that determine performance will be discussed shortly). The other extreme, in which there is a single set containing all the storage lines of the cache and thus any memory line may be placed anywhere in the cache, is called a "fully associative cache". This has the best performance but is typically very expensive to implement.

Although some systems do use direct-mapped caches, more typically, n is chosen to be, say, in the range [2,16], providing a balance between performance and cost of implementation.

With regards to performance of a cache, one factor that influences performance is 'miss rate' which is, trivially, the number of accesses to the cache for data that are not present in the cache divided by the total number of accesses. Hennessey and Patterson categorise 'misses' into three classes: Compulsory, Capacity and Conflict. Compulsory misses are unavoidable and correspond the first ever access of any line. Capacity misses typically depend on the physical size of the cache, while conflict misses are due to the replacements within a set and depend on the associativity of the sets and, in a sense, the data addresses being accessed.

Typically the data for caching is held at a resource identified by an address, such as a memory address, or a hardware resource address in a computing system. The access of such resource addresses can follow certain fixed patterns (such as accesses of sequential memory blocks or of strided accesses of 2D data structures), and care may therefore be taken to ensure that data representing related (e.g. sequential or strided) resource addresses are well-distributed over the cache memory so as to avoid pathological access cases. A sufficiently long sequence of addresses that maps to only a few cache sets is an example of a pathological access case, resulting in a high conflict miss rate since repeatedly accessing the same few cache sets may lead to a significant number of cache line replacements. Even though the compulsory or capacity miss rates may be low, such poor distribution characteristics severely affect the performance of a cache memory. Although implementing a higher cache associativity can reduce the conflict misses, it comes at a power and area cost.

It should be noted that, since the mapping of memory block address to cache sets is a "many to one" relationship, when block data is resident in the cache, it is necessary to store additional data, sometimes referred to as a tag, to identify the original memory location of the block. It is clearly desirable to use as few bits as possible in the tags. With the simple "Chosen Set" mapping scheme described above by Hennessey and Patterson, given a system in which there are $2^S$ sets in the cache and in which the memory has $2^{T+S}$ lines of data, then the tag requires T bits of data. In this scheme it is thus unnecessary to store the full address of the line in the tag as the S least significant bits can be inferred from their physical location in the cache.

Hennessey and Patterson also discuss methods of increasing the cache bandwidth through use of multi-banked caches. The proposal there is to split the cache into $2^k$ banks (k being in the range, say, [1, 3]) and assigning line address, j, to bank, (j mod $2^k$). Hennessey and Patterson state this simple mapping "works well", but it can easily suffer from pathological access patterns in the same manner as the high conflict miss rate described previously.

Several mechanisms have been proposed in the art for improving the distribution of data over a cache and maximising the cache hit rate for a given size of cache. These mechanisms typically use complex hash functions to inject pseudorandom variation into the mapping of data onto cache addresses. For example, M. Schlansker et al. describe the use of a complex hash function to randomise the placement of data in a cache in their paper "Randomization and Associativity in the Design of Placement-Insensitive Caches", Computer Systems Laboratory, HPL-93-41, June 1993. They propose the mapping:

Chosen_set=((LineAddress*LineAddress*174773)/ $2^{21}$)MOD(Number_of_sets_in_cache).

Although this does produce a good distribution when mapping addresses to sets, it suffers from two major drawbacks. The first is that such complex hash functions are generally too expensive in terms of silicon area and latency to be implemented in the critical path of a high speed cache memory system. The second drawback is that the cache tag store needs to keep the entire line address (and not just a subset thereof) as there appears to be no practical method to 'reverse' the hash mapping. The requirement to store a larger tag thus adds considerably to the cost of the cache.

Other mechanisms for improving cache performance by reducing conflict misses include using a skewed-associative cache architecture. Such architectures are described in "A case for two-way skewed-associative caches", A. Seznec, Proceedings of the 20th International Symposium on Computer Architecture, San Diego, May 1993 and in "Trade-offs for Skewed-Associative Caches", H. Vandierendonck and K. De Bosschere (a paper published by Dept. of Electronics and Information Systems, Ghent University). Skewed-associative architectures require multiple cache banks because the mechanism achieves low miss rates through inter-bank dispersion of cache addresses. However, as is observed in the Vandierendonck paper, high performance is achieved by combining a skewed-associative architecture with complex hash functions to inject random character into the mapping of data into the cache. Again, such complex hash functions are generally too expensive to implement in the critical path of a high speed cache memory system.

Replacement policies in cache memories determine which item(s) to discard when a cache line is full. An example is a least recently used (LRU) replacement policy according to which the least recently used item is discarded from a cache line. A further limitation of a Skewed-Associative cache is the constrained set of implementable replacement policies. For example, Seznec states "Unfortunately, we have not been able to find concise information to associate with a cache line which would allow a simple hardware implementation of a LRU replacement policy on a skewed-associative cache." though he does propose a two-way pseudo-LRU scheme that "may work fine". Further examples of possible replacement policies are discussed in Hennessey and Patterson.

Complex hash functions may be replaced with simple, low-complexity functions for distributing resource addresses over a cache memory. However, simple functions do not normally provide the desired distribution characteristics which avoid pathological access cases.

SUMMARY OF THE INVENTION

According to a first aspect of the present invention there is provided cache logic for generating a cache address from a binary memory address comprising a first binary sequence of a first predefined length and a second binary sequence of a second predefined length, the cache logic comprising:
  a plurality of substitution units each configured to receive a respective allocation of bits of the first binary sequence and to replace its allocated bits with a corresponding substitute bit string selected in dependence on the received allocation of bits;
  a mapping unit configured to combine the substitute bit strings output by the substitution units so as to form one or more binary strings of the second predefined length; and
  combination logic arranged to combine the one or more binary strings with the second binary sequence by a reversible operation so as to form a binary output string for use as at least part of a cache address in a cache memory.

Each of the substitution units may comprise a lookup table defining the substitute bit strings and the binary inputs to which each corresponds, the respective allocation of bits for the substitution unit being used as a lookup into its lookup table.

Each substitution unit may have a bit width of 3, 4 or 5.

The substitute bit strings stored at each substitution unit may be precalculated from a set of possible substitute bit strings so as to minimise a correlation between the set of possible binary inputs of the substitution unit and the respective substitute bit strings.

The substitute bit strings stored at each substitution unit may be precalculated from the set of possible substitute bit strings so as to further minimise the correlation between linear combinations of the set of possible binary inputs of the substitution unit and the respective substitute bit strings.

The plurality of substitution units may comprise more than one substitution unit having the same bit width, those substitution units having the same bit width each having a different set of substitute bit strings.

The sets of substitute bit strings at the substitution units may have the same bit width share the same order of substitute bit strings in each set, each set of substitute bit strings being related to the other by a rotation of the substitute bit strings relative to the possible binary inputs of the substitution units.

One or more of the plurality of substitution units may receive fewer input bits than the number of bits present in each of its substitute bit strings, those substitution units being configured to fix the value of its empty input(s) at some predefined bit value or to interpret its empty input(s) as having bit values according to some predefined scheme.

The mapping unit may comprise a set of physical connections defining mappings between the output bits from the substitution units to the bits of the one or more binary strings of the second predefined length.

The combination logic may comprise bit reduction logic and output logic, the bit reduction logic being configured to reduce the one or more binary strings to an intermediate binary string of the second predefined length, and the output logic being configured to combine the intermediate binary string with the second binary sequence by a bitwise reversible operation so as to form the binary output string.

The binary output string may be for identifying a cache row in a cache memory bank.

The first binary sequence may be a predetermined sequence of the most significant bits of the binary memory address.

The second binary sequence may be a predetermined sequence of less significant bits of the binary memory address.

The binary input memory address may have a fixed length and the first and second binary sequences are adjacent sequences of bits in the binary memory address.

The reversible operation performed at the combination logic may comprise one or more bitwise XOR operations.

The cache logic may further comprise a bank selection unit configured to combine one or more bits derived from the binary output string with an equal number of bits of the binary memory address by means of a second bitwise operation so as to generate a bank identifier for identifying a bank in a cache memory having a plurality of cache banks.

The bank identifier may be equal in length to the number of bits derived from the binary output string.

The one or more bits of the binary memory address may be less significant bits than the bits of the second binary sequence.

The one or more bits of the binary memory address may be adjacent to the second binary sequence in the binary memory address.

The cache logic may further comprise a bank scramble unit having a bit register configured to store a predetermined binary string, the bank scramble unit being configured to operate on the one or more bits of the binary output string by using a sequence of one or more bits from the binary output string as a lookup in the bit register so as to select a predetermined number of bits from the stored predetermined binary string for use as the one or more bits derived from the binary output string in the bank selection unit, wherein the predetermined binary string has the property that the value of the selected bits has substantially the same likelihood of being any of the possible values.

The predetermined binary string may be a pseudorandom binary string.

The predetermined binary string may be $2^M$ bits long and the predetermined sequence of bits from the binary output string may be the M least significant bits of the binary output string, the bank scramble unit being configured to use the M least significant bits of the binary output string as a bit address in the predetermined binary string from which to read the predetermined number of bits from the stored predetermined binary string.

The bit register may be programmable and the bank scramble unit may be operable to enable a pseudo-randomly generated binary string to be written into the bit register for use as the predetermined binary string.

According to a second aspect of the present invention there is provided a cache memory system comprising:
  the cache logic; and
  cache memory having a plurality of cache banks;
wherein the cache memory system is configured to store at the cache row indicated by the binary output string of the cache bank indicated by the bank identifier at least the first binary sequence and data for caching having the binary memory address.

Each cache bank may have $2^S$ rows, where S is the number of bits in the second binary sequence.

According to a third aspect of the present invention there is provided a method for generating a cache address from a binary memory address comprising a first binary sequence of a first predefined length and a second binary sequence of a second predefined length, the method being performed at cache logic, the method comprising:
  allocating bits of the first binary sequence to each of a plurality of substitution units of the cache logic;
  at each of the substitution units, using the allocated bits of the first binary sequence to determine a corresponding substitute bit string and replacing the allocated bits with that substitute bit string;
  transforming the plurality of substitute bit strings from the plurality of substitution units into one or more binary strings of the second predefined length; and
  combining the one or more binary strings with the second binary sequence by a reversible operation so as to form a binary output string for use as at least part of a cache address in a cache memory.

The using the allocated bits of the first binary sequence to determine a corresponding substitute bit string may comprise using the allocated bits of the first binary sequence as a lookup into a lookup table of the substitution unit.

The combining may comprise reducing the one or more binary strings of the second predefined length to an intermediate binary string of the second predefined length, and combining the intermediate binary string with the second binary sequence by a bitwise reversible operation so as to form the binary output string.

The method may further comprise combining one or more bits derived from the binary output string with an equal number of bits of the binary memory address by means of a second bitwise operation so as to generate a bank identifier for identifying a bank in a cache memory having a plurality of cache banks.

The cache logic may be embodied in hardware on an integrated circuit. There may be provided a method of manufacturing, at an integrated circuit manufacturing system, the cache logic. There may be provided an integrated circuit definition dataset that, when processed in an integrated circuit manufacturing system, configures the system to manufacture the cache logic. There may be provided a non-transitory computer readable storage medium having stored thereon a computer readable description of an integrated circuit that, when processed in an integrated circuit manufacturing system, causes the integrated circuit manufacturing system to manufacture the cache logic.

There may be provided an integrated circuit manufacturing system comprising:
  a non-transitory computer readable storage medium having stored thereon a computer readable integrated circuit description that describes the cache logic;
  a layout processing system configured to process the integrated circuit description so as to generate a circuit layout description of an integrated circuit embodying the cache logic; and
  an integrated circuit generation system configured to manufacture the cache logic according to the circuit layout description.

There may be provided computer program code for performing a method as claimed in any preceding claim. There may be provided non-transitory computer readable storage medium having stored thereon computer readable instructions that, when executed at a computer system, cause the computer system to perform the method as claimed in any preceding claim.

DESCRIPTION OF THE DRAWINGS

The present invention will now be described by way of example with reference to the accompanying drawings, in which.

DETAILED DESCRIPTION OF THE DRAWINGS

The following description is presented by way of example to enable a person skilled in the art to make and use the invention. The present invention is not limited to the embodiments described herein and various modifications to the disclosed embodiments will be apparent to those skilled in the art.

Cache logic for a high speed cache memory system is described herein which provides excellent distribution characteristics without introducing significant complexity and latency. The cache logic may handle any kind of data, including, for example, resource addresses (such as memory and hardware addresses), processor instructions, and data from a memory.

Figure 1:
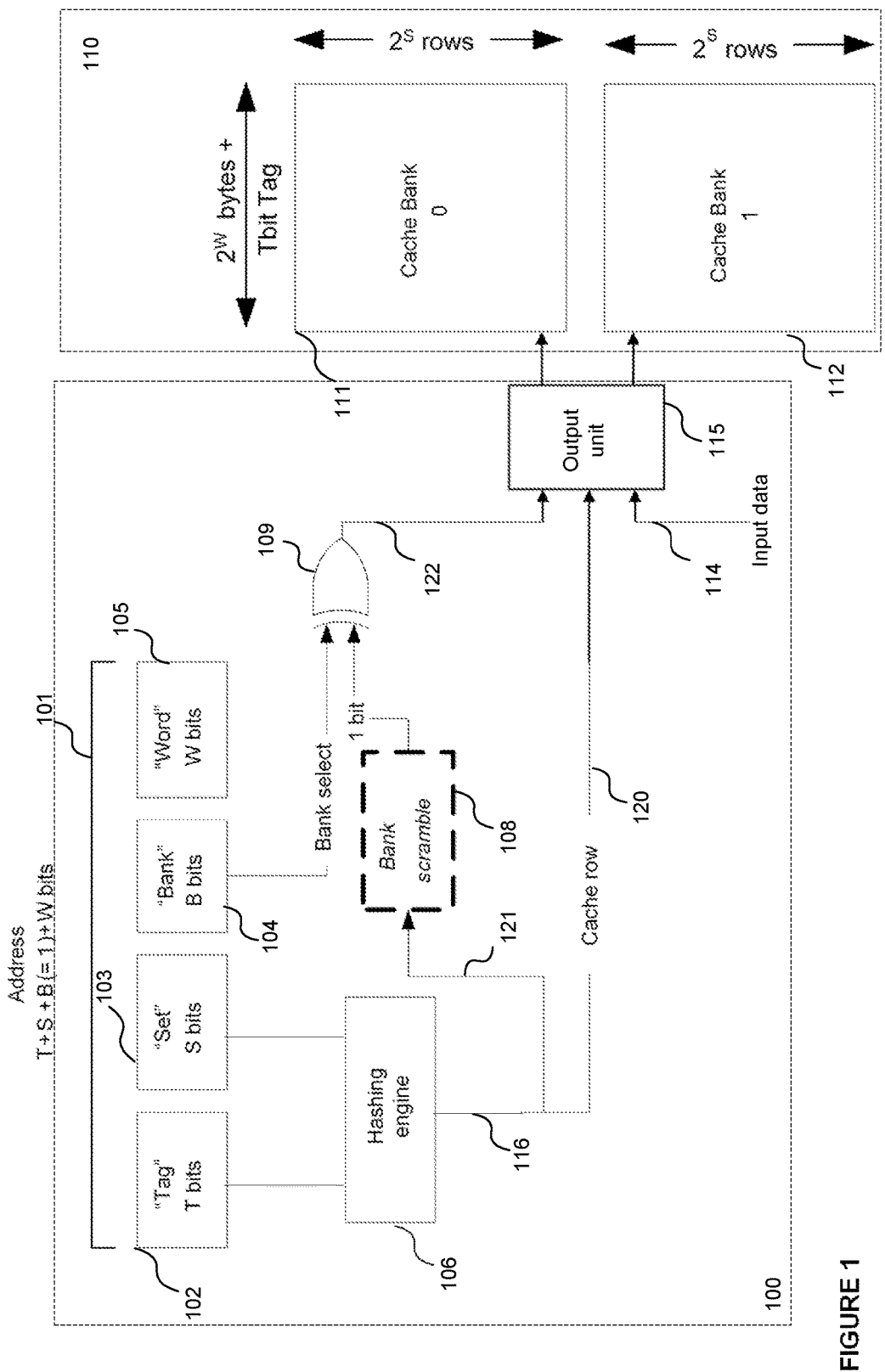
FIG. 1 is a schematic diagram of a cache memory system configured in accordance with the principles described herein and having two banks.

A schematic diagram of a cache memory system is shown in FIG. 1. Cache logic 100 is arranged to determine a cache address for cache memory 110 (typically not part of the cache logic) at which input data 114, having a binary input memory address 101, is to be cached or from which cached data is to be read. In accordance with the invention described herein, part of an input memory address 101 may be stored at the cache memory, and the remaining parts of the input memory address may be inferred from the location of the data in the cache memory. Cache memory 110 could have any suitable memory architecture: for example, it could be a direct mapped cache memory or an N-way set associative cache memory. An example of a method performed by the cache logic is illustrated in the flowchart of FIG. 4 and will be referred to herein.

Cache logic 100 comprises a hashing engine 106 arranged to determine a cache row address from the input address 101. In the example shown in FIG. 1, the cache memory 110 comprises two cache banks (111 and 112) and a bank selection unit 109 is provided at the cache logic 100 to select a cache bank. A bank scramble unit 108 may optionally be provided to further improve the performance of the cache logic. The operation of the cache logic will now be described with reference to FIG. 1.

Figure 4:
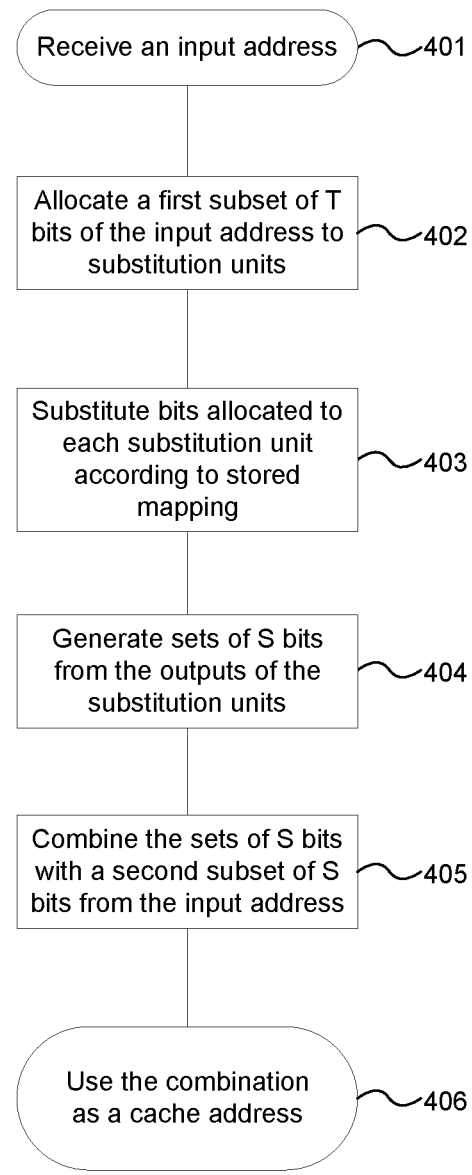
FIG. 4 is a flowchart illustrating a method of generating a cache set address.

Cache logic 100 is configured to determine a cache address from the input memory address 101 it receives (step 401 in FIG. 4). The memory address 101 would typically be of fixed length. More generally the input memory address 101 could be any kind of binary string. In the present example the input memory address 101 is a resource address expressed as a binary string.

In the example shown in FIG. 1, the memory address 101 comprises four sequences of bits: (i) T tag bits 102, (ii) S set bits 103, (iii) B bank bits 104, and (iv) W word bits 105. Therefore the memory address 101 has a length of T+S+B+W bits. Tag bits T are the most significant bits and word bits W are the least significant bits of the memory address 101. It will be appreciated that other groupings of bits are possible and the bits of a group need not be contiguous within the binary string 101.

Usually the cache memory 110 is smaller than the main memory to which the memory address 101 relates, with data in a particular cache line corresponding to data stored at one of a plurality of different memory addresses in the main memory. In a typical cache system, the set and bank bits of the memory address 101 for a line of data are those bits that can be inferred, possibly in combination with the cache line tag, from the set in the cache memory 110 at which the data is stored (or is going to be stored) The tag bits of the memory address 101 are those bits that cannot be inferred from the location in the cache memory 110. The tag bits distinguish between the line memory addresses which correspond to the same cache set. Therefore, the tag bits are stored in the cache memory 110, but the set and bank bits do not need to be, and preferably are not, stored in the cache memory 110 when data is stored in the cache memory 110. The word bits indicate a location of data in the main memory to a greater resolution than a cache line, and since data is stored in the cache memory 110 in units of cache lines, the word bits do not need to be stored in the cache memory 110 (though in some implementations they could be).

In the example shown in FIG. 1 there are two cache banks 111 and 112 such that one bank bit is sufficient for identifying one of the cache banks, so B=1 in this example. However, in other examples there may be a different number of banks in the cache memory, and usually the number of banks in the cache memory would be a power of two, such as two, four, eight, etc. In these other examples, B might not be equal to one, and instead there could be a number of bank bits (B) which is sufficient for identifying a bank in the cache memory in accordance with the number of banks in the cache memory. The cache rows of the cache memory 110 in the present example are $2^W$ bytes+T bits wide such that the tag bits 102 are stored with the data in the cache lines, but in other examples the tag bits 102 may not necessarily be stored adjacent to the data bits in the cache lines. For example, it may be useful to allow faster access to the tag bits (e.g. to determine whether the cache currently stores a particular data item, i.e. to determine whether there is a cache hit or a cache miss), with the cache memory being arranged to store the tag bits 102 at a unit of the cache memory 110 which allows faster access than a unit of the cache memory at which the data itself is stored. Generally, the cache memory 110 may be an N-way set associative cache, in which case each cache line may be $2^W \times N$ bytes+TN bits wide, as appropriate, (though, those skilled in the art will appreciate additional storage and logic may be necessary to manage the cache replacement policy, e.g. LRU).

Hashing engine 106 is configured to operate on the tag bits 102 and set bits 103 from the binary input memory address 101 in order to generate a binary output 116. In the present example, binary output 116 is equal in length to the sequence of S bits 103 from the binary input memory address 101 and used as a cache line address in cache memory 110. In the present example the string of T bits is longer than the string of S bits, i.e. T>S.

The sequence of T bits may be the T most significant bits of the input binary memory address 101 and the sequence of S bits may be a sequence of less significant bits. In the example shown in FIG. 1, the "set" bit sequence 103 is adjacent to the "tag" bit sequence 102 in the input binary memory address 101. The tag bits are typically stored with the input data at the cache memory.

The hashing engine 106 is configured to generate a cache row address in such a way as to distribute input memory addresses over the rows of the cache memory. The purpose of the hashing engine 106 is therefore to reduce the likelihood of regular patterns of addresses causing an uneven usage of cache lines. The output 116 of the hashing engine 106 is used as a cache line/row identifier in cache memory 110 and indicates at which line tag bits 102 and the data itself are to be stored. Each cache bank may have $2^S$ rows such that each S bit output 116 identifies a particular cache line.

The hashing engine 106 may be configured with a view to providing the characteristic of a good cryptographic hashing function in that if one input bit changes then, on average, roughly half of the output bits 116 change. Furthermore, if a different one of the input bits changes then, on average, we would expect different bits of the output bits 116 to change but we would still expect around half of the output bits 116 to change. In examples described herein, this is achieved without the complex processing and latency typically introduced by cryptographic hashing functions. The general aim is that for any change to the tag bits 102 (irrespective of how many of those bits change), on average, approximately half of the output bits 116 will change, and that for different changes to the input bits, different ones of the output bits 116 will change.

Figure 3:
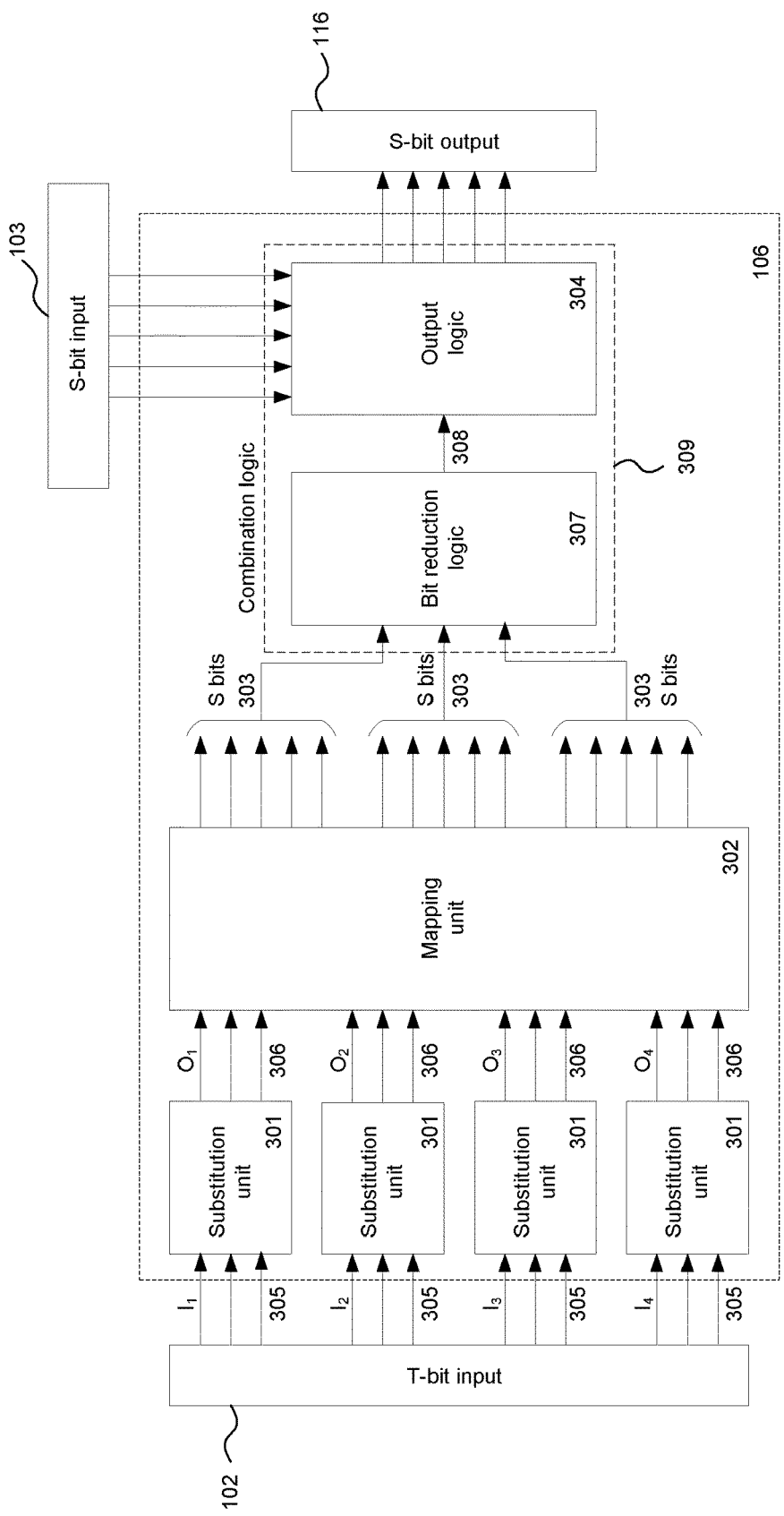
FIG. 3 is schematic diagram of the hashing engine of the cache memory system.

An example configuration of hashing engine 106 is shown in FIG. 3. The hashing engine comprises a plurality of substitution units 301, a mapping unit 302, bit reduction logic 307, and output logic 304. Bit reduction logic 307 and output logic 304 together represent an example of combination logic. Each substitution unit 301 is configured to receive a selection of bits 305 from the T-bit input 102 and to provide a set of bits 306 to the mapping unit 302. The mapping unit 302 is configured to combine the sets of bits 306 provided by the substitution units so as to generate binary strings 303, which in this example are each of length S. Combination logic 309 is configured to combine the binary strings with the S-bit input string 103 in order to generate S-bit output string 116.

By arranging that each binary string 303 formed at the mapping unit 302 is equal in length to the sequence of S bits 103, combination logic 309 may be configured to combine the binary strings and the S-bit sequence by means of simple bitwise operations, such as XOR operations. Other arrangements are possible in which the binary strings 303 formed by the mapping unit are not S bits in length.

An exemplary configuration of the substitution units, mapping unit, bit reduction logic and output logic will now be described in more detail.

Each substitution unit 301 is configured to replace the selection of tag bits 305 according to a predefined substitution for that selection of tag bits. For example, each substitution unit may include or have access to a look up table (LUT) which defines the output substitution bits 306 for a given received selection of tag bits 305. The sets of output substitution bits 306 provided by a substitution unit may be equal in length to the selection of tag bits received at that substitution unit. For example, a substitution unit may be configured to operate on a 3 bit string from the tag binary string 102 and to output a substitute 3 bit string. A substitution unit configured to operate on a 3 bit string and provide a 3 bit output may be termed a 3 bit substitution unit. Different substitution units may be configured to operate on different lengths of bit string.

Each substitution unit is arranged to receive a predefined selection of bits from the tag input 102. At design time, a random allocation of bits may be selected, or some ordered (possibly contiguous) selection of bits from the tag input may be provided to each substitution unit. An optimal allocation may be determined through modelling at design time, as is described in more detail below.

A substitution unit of width N bits will have $2^N$ possible inputs. For example, a 3-bit substitution unit will have 8 possible inputs: 000, 001, 010, 011, 100, 101, 110, 111. Those binary strings also represent the possible binary outputs. At a substitution unit, each binary input is substituted by and uniquely corresponds to a binary output.

A set of substitution units 301 is provided which is sufficient to provide substitute bit strings for the T bits of string 102. For example, if tag string 102 is 12 bits long, four substitution units may be provided, each configured to operate on 3 bits selected from the tag string. This example is shown in FIG. 3. In another example, tag string 102 is 17 bits long and four substitution units are provided, comprising two 5-bit substitution units, one 4-bit substitution unit and a 3-bit substitution unit. Or, when tag string 102 is 17 bits long, one 5-bit substitution unit and three 4-bit substitution units may be provided. It may be considered preferable to use wider substitution units where possible because a wider unit (e.g. a 5-bit vs a 3-bit unit) typically exhibits improved non-linearity.

In some embodiments, substitution units may receive too few bits, e.g. where 102 is 10 bits long and a 5 bit and two 3 bit substitution units are provided (to give a total bit width of 11 bits). In such cases, the substitution unit may be configured to infer the missing bits from the received bits according to some predefined scheme, or to fix those missing bits at some predefined bit value. The required output bits from such a substitution unit may be a predefined selection of the output bits from the substitution unit, or selected according to some predefined scheme in dependence on the output bits from the substitution unit. In practice, however, faced with a 10-bit tag string, and following the general preference to use wider units where possible, two 5-bit substitution units may be used.

Subsets of tag bits may be allocated to the substitution units 301 according to any possible selection provided that the selection is maintained for a given cache session (e.g. until the cache is flushed). This is step 402 in FIG. 4. The selections are predefined at the cache logic 106. For example, the bit selections from tag string 102 may be hardwired from a register holding the tag string to the inputs of each substitution. Each substitution unit may be arranged to receive, for example, a contiguous selection of tag bits; a predefined pseudo-random sampling of tag bits; a selection of tag bits according to a predefined pattern. In some examples, the substitution units are arranged such that each of the tag bits is provided to one, and only one, of the substitution units 301. It can be advantageous to determine an optimal selection of tag bits at design time through the modelling of different configurations of the cache logic and selecting the best performing configuration.

Each substitution unit is configured to replace its allocated bit selection from the tag bits with substitute bits according to the predefined substitutions which it holds or has access to. This is step 403 in FIG. 4. Each substitution unit may include a look up table (LUT) defining the substitutions for the possible range of incoming bits 305. The LUT may be hardwired at manufacture, or could be a programmable store into which suitable pre-calculated substitution sets may be loaded (e.g. at initialisation of the cache logic). The mappings are precalculated at design time so as to ensure that the set of possible tag bit inputs 102 is well distributed over the cache lines of the cache memory 110. As noted above this precalculation may include an assessment of an optimal set of bit allocations to the substitution units and/or combinations of the bit outputs 306 at mapping unit 302. The precalculation is performed at design time when substantial processing power and time can be allocated to the task; the results of the precalculation are embodied in the look-up tables of the substitution units and the allocation of tag bits to the substitution units. The substitution units may then perform a simple bit substitution for each tag bit input and without any substantive processing being performed by the substitution units. This approach allows the cache logic to operate at very low latency while exhibiting the optimal cache line distribution characteristics identified at design time. In other words, bit substitution can be performed very quickly and does not require any substantial processing to be performed; the substitution units 301 do not therefore introduce significant delay into the critical path of the cache logic.

One aim of the substitution function units is to minimise linearity. For example, here we can define a substitution unit to be linear over an binary operator, o, as being the relationship $$\forall \text{inputs } A_i, A_j, \text{Sub}(A_i) \bigcirc \text{Sub}(A_j) = \text{Sub}(A_i \bigcirc A_j) \bigcirc C$$

with a given constant, C and where $A_k$ are the tag bit inputs. In some examples, "partial" linearity may be considered by checking if the condition holds for a significant subset of the input or the output bits. The operator is typically assumed to be bitwise XOR, but could instead another operator, such as addition (modulo $2^S$).

Providing a plurality of substitution units arranged to each receive a limited number of input bits selected from the tag bits allows the precalculation of all, or at least a statistical sampling of, possible substitutions for every possible combination of the input bits. Such precalculation is feasible on current multi-core servers for 3, 4 and 5 bit substitutions (i.e. substituting a 3 bit binary input 305 with a 3 bit binary output 306). Bit substitutions of greater width may be possible on supercomputers or by employing cloud resources. However, the amount of processing required increases very quickly with the bit width of the substitution space. For a given bit width N, the number of possible substitutions across all of the possible input bits is given by $2^N!$. For N=3 this equates to 40,320, for N=4 this is 20,922,789,888,000. For N=5 this is (approximately) $2.6313 \times 10^{35}$ while $2^6!$ is a number of the order of $10^{89}$ which is currently too large a number space to exhaustively process. Furthermore, the logic required to implement a substitution unit increases as the width of the substitution unit increases (in typical implementations the logic cost might increase by around a factor of 4 for each additional input/output bit).

In some examples, at design time one of the input to output mappings may be considered "fixed" with the mappings for the other inputs of a substitution unit being selected according to the scheme described herein. For example, input "0" may be a fixed mapping to a particular output, again perhaps "0", which reduces the search space of the possible mappings of the remaining bits to a mere $(2^N-1)!$.

A tag bit string 102 of any length can be handled at the cache logic by (as has been described) splitting the string into manageable chunks of, say, 3, 4 or 5 bits and allocating them to substitution units of respective width 3, 4 or 5 bits. It is feasible to calculate optimal or near-optimal sets of substitutions for units up to around 5 or 6 bits in width. Substitution units as narrow as 3 bits offer reasonable performance in terms of providing an even yet pseudorandom distribution of outputs over the range of possible 3 bit inputs. In general, the wider the substitution unit, the better the quality of the distribution may be, although this must be balanced against a) the rapidly increasing difficulty of pre-processing a good set of substitutions as the number of bits increases and b) the increasing cost of implementing such a substitution unit in hardware and/or software.

For the examples described below, we define $B_n$ to be the set of all n-bit binary strings:

$$B_n = \{b^i = d_n^i \ldots d_2^i d_1^i | d_j^i \in \{0,1\}\}$$

and so $|B_n| = 2^n$. A substitution, $S_{nm}$, from n bits to m bits, is then a function:

$$S_{nm}: B_n \to B_m$$

For a bit string, b, $b \in B_n$, we define $b_{[i]}$, $1 \le i \le n$, to be the "i'th" bit of string b, i.e. $b = b_{[n]} \ldots b_{[1]}$, and the binary operator, $\oplus:\{0,1\} \times \{0,1\} \to \{0,1\}$, to be 'exclusive or' (XOR).

One approach to calculating a good set of substitutions, $\{S_{nm1} \ldots S_{nmk}\}$, for a mapping of n input bits to m outputs in a substitution unit is to aim to satisfy one or more of the following three conditions:
  i. that each of the possible $2^m$ binary outputs is produced approximately equally often and preferably exactly equally often. Subjective substitutions are preferably chosen and in the case where n=m, implying they should also, preferably, be bijective;
  ii. that if any of the n input bits change, each output bit has roughly a 50% chance of changing;
  iii. that the 'correlation' between binary inputs and corresponding binary outputs is minimised over the complete set of possible binary inputs.

There are many possible ways of calculating substitutions which satisfy the above conditions. It can often be assumed that each of the possible binary inputs of a substitution unit will be used equally often. For the cases where n=m, if the substitution has a one-to-one correspondence between input and output binary strings (i.e. a bijection), each of the possible binary outputs for a given set would therefore be produced equally often. The first condition may often be assumed to be satisfied.

The second condition may be used, not only as a metric for determining the quality of a given substitution, but also as the basis of a heuristic for producing potentially good quality candidate substitutions. Given a current candidate, (which for the case of n=m, may be initialised, on the first iteration, to, say, the identity substitution), a new candidate may be produced as follows: A current candidate is copied to the new candidate, $S'_{nm}$. Now consider this candidate substitution to be represented as a table with $2^n$ entries, in which the entry at index j, contains $S_{nm}(b^j)$, i.e. the m-bit string to which bit string $b^j$ is mapped.

The candidate substitution array is now 'shuffled' as follows: For each bit position, k, $1 \le k \le n$, consider each of the $2^{n-1}$ pairs of bit strings, $P_i^k$, $P_i^k = \{b_i^{k,0}, b_i^{k,1}\}$, $1 \le i \le 2^{n-1}$, such that $b_i^{k,0}$ & $b_i^{k,1}$ only differ at position k, i.e. $b_i^{k,0}{}_{[j]} = b_i^{k,1}{}_{[j]}$ iff $j \ne k$. The entries in the table corresponding to strings $b_i^{k,0}$ & $b_i^{k,1}$ are 'randomly' swapped with a probability $R_{swap} \in (0,1)$. In total, the random choice is thus made $n \cdot 2^{n-1}$ times on the table to generate the new candidate. This new candidate can then be analysed for quality.

If the initial parent candidate is the identity substitution, then $R_{swap}$ may be chosen to be ½, i.e. each swap should have a 50% chance of occurring. The $R_{swap}$ value may be gradually reduced on subsequent iterations, each iteration producing a new candidate.

This approach could be used to generate possible sets of bits which satisfy condition (ii) above. Those possible sets may then be tested in the manner described below.

Alternatively, substitution sets generated to satisfy condition (ii) may be checked to determine how closely they satisfy condition (iii), with only those sets which satisfy condition (iii) being considered to be good substitution sets for use at a substitution unit.

In some embodiments, no attempt may be made to satisfy condition (ii).

A means of evaluating (iii) is as follows. A set of discrepancy functions, $D_j$, that map a substitution, a selection of j input bits, and a selected output bit to a scalar value, representing the absolute difference from an 'ideal' result are defined:

$$D_1(S_{nm}, i_1, o) = \left| \frac{1}{2} - \frac{1}{2^n}\left(\sum_{\forall b \in B_n} b_{[i_1]} \oplus S_{nm}(b)_{[0]}\right) \right|$$

$$D_2(S_{nm}, i_1, i_2, o) = \left| \frac{1}{2} - \frac{1}{2^n}\left(\sum_{\forall b \in B_n} b_{[i_1]} \oplus b_{[i_2]} \oplus S_{nm}(b)_{[0]}\right) \right|$$

$$D_3(S_{nm}, i_1, i_2, i_3, o) = \left| \frac{1}{2} - \frac{1}{2^n}\left(\sum_{\forall b \in B_n} b_{[i_1]} \oplus b_{[i_2]} \oplus b_{[i_3]} \oplus S_{nm}(b)_{[0]}\right) \right|$$

And so on for the set of possible discrepancy functions. It will be appreciated that other types of discrepancy functions may be defined.

Using the discrepancy functions we can define metrics such as:

$$M_1(S_{nm}) = \max_{\substack{\forall i \in \{1 \ldots n\} \\ \forall o \in \{1 \ldots m\}}} (D_1(S_{nm}, i, o)) \text{ and}$$

$$T_1(S_{nm}) = \sum_{\substack{\forall i \in \{1 \ldots n\} \\ \forall o \in \{1 \ldots m\}}} D_1(S_{nm}, i, o)$$

$$M_2(S_{nm}) = \max_{\substack{\forall i_1 \in \{1 \ldots n-1\} \\ \forall i_2 \in \{i_1+1 \ldots n\} \\ \forall o \in \{1 \ldots m\}}} (D_2(S_{nm}, i_1, i_2, o)) \text{ and}$$

$$T_2(S_{nm}) = \sum_{\substack{\forall i_1 \in \{1 \ldots n-1\} \\ \forall i_2 \in \{i_1+1 \ldots n\} \\ \forall o \in \{1 \ldots m\}}} D_2(S_{nm}, i_1, i_2, o)$$

And so on, where $M_j$ determines a worst case score and $T_j$, an overall score for a combination of j input bits versus all output bits. The metrics set out here are merely examples. It will be appreciated that other metrics may be defined based on the discrepancy functions.

To find substitutions that satisfy the third condition, an approach, for very small N, is to try all $2^N!$ substitutions, (or $(2^N-1)!$ in the case mentioned above that one of the mappings is fixed), or, for larger N, a subset of the possible substitutions, and evaluate a score for each. For example, scores using all (or a subset) of the $M_i$ metric functions above may be calculated and those substitutions that minimise the score may be chosen. In the event of ties, the $T_i$ metrics may also be used. Alternatively just the $T_i$ metrics could be employed.

In essence applying the metrics above may be considered to be equivalent to measuring the correlation between linear combinations of the input bits and each output bit, and attempting to choose substitutions that minimise the correlation.

In some examples, a measure of covariance may be used to score each set of binary outputs. Those sets having a covariance whose magnitude is close to zero (e.g. less than a predefined absolute covariance or the or those set(s) having the lowest magnitude covariance) may be considered to satisfy condition (iii) above. One may recall that the covariance of two variables, cov(X, Y), is given by, $$cov(X,Y) = \overline{X \cdot Y} - \overline{X} \cdot \overline{Y}$$

For the purposes of this discussion, given a set of q pairs of values, the covariance may be expressed as:

$$cov(X, Y) = \frac{\sum_{j=1 \ldots q} X_j \cdot Y_j}{q} - \left( \frac{\sum_{j=1 \ldots q} X_j}{q} \cdot \frac{\sum_{j=1 \ldots q} Y_j}{q} \right)$$

For example, with a given substitution, $S_{nm}$, to compute the covariance of input bit i with output bit, o, one would have:

$$\frac{\sum_{\forall b \in B_n} b_{[i]} \cdot S_{nm}(b)_{[o]}}{2^n} - \left( \frac{\sum_{\forall b \in B_n} b_{[i]}}{2^n} \cdot \frac{\sum_{\forall b \in B_n} S_{nm}(b)_{[o]}}{2^n} \right)$$

In the majority of practical use cases, one would expect the output bit values to occur equally often so this would reduce to:

$$\frac{\sum_{\forall b \in B_n} b_{[i]} \cdot S_{nm}(b)_{[0]}}{2^n} - \frac{1}{4}$$

which produces a result in the range $[-1/4, 1/4]$. The closer the result is to zero, the less correlated the values are.

Typically there will be multiple possible sets of substitutions with the same covariance, from which a set may be picked at random for use as a set of substitutions at a substitution unit. The group of possible substitution sets may be further refined through the use of other scores and/or in dependence on which substitution sets are in use at other substitution units (it can be advantageous to use different substitution sets for different substitution units of the cache logic having the same bit width).

Condition (iii) above which aims to minimise the correlation between the binary inputs and outputs of a substitution unit can be generally expressed as the requirement that:

$$\forall \text{Correlation}(I_i, O_j) \approx 0$$

where $I_i$ is the set of input bits and $O_j$ is the set of output bits. The examples described above for evaluating condition (iii) are examples that enable this correlation condition to be met or at least substantially achieved.

It can further improve the performance of a substitution unit if the substitution set in use at the unit is chosen so as to additionally minimise the correlation between linear combinations of the input and/or output bits. In other words, that:

$$\text{Correlation}(I_i, I_k, O_j) \approx 0$$

For example, each set of binary outputs could be further scored in dependence on a measure of the correlation between linear combinations of the input and/or output bits. Such a measure of correlation could be formed by calculating a covariance between the set of linear combinations of input bits and the output bits. Higher order combinations of the input and/or output bits could be additionally or alternatively employed at the cost of an increased demand in processing.

An example of how to determine a good set of substitutions at design time for a 3-bit substitution unit will now be described.

It is realistic to compute all of the possible sets of possible substitutions for a 3-bit wide substitution unit. One such set of substitutions is shown below:

| Input      | Output   |
|------------|----------|
| "000" =>   | "100";   |
| "001" =>   | "110"    |
| "010" =>   | "111"    |
| "011" =>   | "010"    |
| "100" =>   | "101"    |
| "101" =>   | "000"    |
| "110" =>   | "001"    |
| "111" =>   | "011"    |

A different substitution set could be achieved by keeping the list of inputs fixed and rotating each of the outputs by one position but maintaining the order of the outputs. Equally, a different substitution set would be achieved by changing the order of the binary output strings. It will therefore be appreciated that there are a large number of possible sets of output bits for a given set of input bits.

A score may be calculated at design time along the above described lines for every possible set of substitutions for a given set of binary inputs and those scores used to select one or more "good" sets of substitutions. One of the good sets may be chosen at random for use at a given implementation of a substitution unit 301 in cache logic 100.

For substitution sets having greater bit widths (e.g. 5 bits), or where limited processing resources are available at design time, a statistical sampling approach may be adopted rather than exhaustively evaluating every possible set of binary outputs. Such sampling may be achieved in many different ways. One possible approach will now be described.

In some examples, good sets of substitutions may be identified in two stages. In a first stage, a random selection of substitution sets may be evaluated in order to identify an initial guess at one or more good substitution sets. Such evaluation may be performed by scoring each substitution set—for example, by calculating a measure of the covariance between the binary outputs represented by that set and the set of binary inputs, in which case those substitution sets having relatively low scores might represent the most promising candidates. The one or more of the substitution sets representing the most promising candidates for good substitution sets may then be used in a second stage.

In the second stage, an iterative process may be adopted to identify improvements to the initial guess. For instance, one or more changes could be made to the substitution set selected at the first stage, such as swapping two or more binary outputs in the set such that two or more binary inputs map to different binary outputs. Examples of such iterative processes are described above for condition (iii). The score of the modified substitution set may then be evaluated to establish whether the change has improved the substitution set (e.g. whether the covariance score of the modified substitution set is lower than the original unmodified substitution set). If the change improves the substitution set, the change is maintained and a new modification to the substitution set may be tested; otherwise the change is rejected and a new modification to the substitution set may be tested. This iterative process allows good substitution sets to be identified which satisfy the above three conditions but at a substantially lower processing cost than exhaustively processing all possible substitution sets so as to identify good sets.

Many variations on the above two stage approach are possible. In some examples the first stage may be omitted and the second stage performed directly on a random selection of possible substitution sets.

The substitution units 301 of the hashing engine 106 of FIG. 3 may be configured to use good substitution sets precalculated in accordance with the above examples. This ensures that each substitution unit generates binary outputs 306 in accordance with the desired characteristics of a good hash described above at points (i) to (iii). Substitution units having the same width may use the same substitution sets, but preferably such units use different substitution sets. Different substitution units may use substitution sets derived from the same base set but which are rotated relative to one another.

The binary outputs 306 from the substitution units are combined at mapping unit 302 so as to form one or more groups of S-bits 303. This is step 404 in FIG. 4. This may be done in any manner, for example by simply grouping adjacent bits of the binary outputs 306 into groups of S bits, although it can be advantageous to model the effect of different combinations of binary outputs at design time in order to identify optimal combinations of the output bits 306 into S-bit groups 303. The combination of bits is fixed so that, when the cache logic is running, the same bits of the binary outputs 306 contribute to the same bits of the S-bit groups 303 from one cache address to the next. The mapping unit may comprise hardwiring of bits from the binary outputs 306 from the substitution units to the S-bit groups 303 that provide the inputs to the bit reduction logic 307.

In some examples the total number of output bits 306 will not divide evenly into S. In such cases the mapping unit may be configured to generate additional bits such that its output groups 303 each comprise S bits. In other examples, the mapping unit may be configured to generate one or more bits to ensure that each of the groups 303 has S-bits. The mapping unit may be configured to infer additional bits from the received bits according to some predefined scheme. For example, given M input bits where M=jS+k with k<S, then the mapping unit may be configured to generate k of the output bits using j+1 inputs and the remainder using just j. In other examples, the mapping unit may be configured to pad out a group 303 which would otherwise have fewer than S bits with bits having some predefined bit value, such as zero.

In this manner the mapping unit may provide an integer number of complete S-bit groups to bit reduction logic 307. For example, if each of the four substitution units 301 is a 3-bit unit providing a 3-bit output 306 and S=5, then three groups 303 of S-bits are required. Of the 15 bits in total of the S-bit groups, only 12 bits are provided by the substitution units. Three bits of the S-bit groups may therefore be predefined: this could be in any manner: e.g. one bit of each S-bit group may be fixed as a 0 or 1, or three bits of the last S-bit group may be fixed, etc.

It is however preferred that the substitution units are configured to provide a sufficient number of bits from which the mapping unit can create an integer number of S-bit groups. This makes use of the good hashing qualities of the substitution sets used at the substitution units, rather than simply providing fixed bits to fill any shortfall in the number of bits received at the mapping unit from which to generate the S-bit groups 303.

Bit reduction logic 307 may be provided to combine the S-bit groups 303 from the mapping unit 302 and provide an S-bit binary string 308 to output logic 304. The bit reduction logic 307 could operate in a number of ways. For example, the bit reduction unit could be configured to select N bits of the S-bit groups 303 (e.g. at random or according to a predetermined selection) and XOR them together to determine one bit, and then repeat this S times until the N×S bits of the groups 303 have been reduced to S-bit binary string 308. In another example, some predefined substitution could be used to convert N×S bits to S bits. The reduction to S bits by bit reduction logic could be performed in a number of other ways in other examples.

The output logic 304 is configured to combine the S-bit input 103 from the input address 101 with the S-bit binary string 308 from the bit reduction logic by a reversible bitwise operation so as to form an S-bit output 116. This is step 405 of FIG. 4. For example, the S-bit binary string 308 and the S-bit input 103 may be combined by bitwise XOR operations:

$$S_{out} = S_{red} \oplus S_{in}$$

where $S_{out}$ is the output 116, $S_{in}$ is the input 103, and $S_{red}$ is the S-bit binary string 308. The S-bit output 116 may be used at the cache logic 100 (at which hashing engine 106 is supported) as a cache line address, as shown in FIG. 1 and as step 406 of FIG. 4.

It is the performance of the hashing engine as a whole which is important so that the cache line addresses 116 it outputs are well-distributed over the cache lines in a manner which avoids poor cache performance such as pathological access cases. Choosing that each substitution unit of the hashing engine uses a good hash enables good performance at the hashing engine as a whole. A good hashing engine similarly satisfies the three conditions set out above. It can be advantageous to model the hashing engine at design time so as to determine one or more of the following:

a) an optimal allocation of bits from the tag input 102;
b) an optimal combination of substitution sets at substitution units of the same bit width;
c) an optimal combination of the binary outputs 306 from the substitution units into groupings 303—this might include determining an optimal use of fixed binary values at the mapping unit to ensure that each group 303 comprises S bits;
d) an optimal combination of the S-bit inputs 303 and 103 at combination logic 309—e.g. the choice of bitwise operation which is to be performed.

The optimal configurations may be determined in any suitable manner, including according to the principles described here. In order to pre-calculate the effect of changes to one or more of (a) to (d) above on the performance of the hashing engine as a whole, the performance of the hashing engine may be assessed at design time by running a model of the cache logic. Such a model may be used to simulate the performance of the hashing engine by operating the model on test input addresses 101, making changes to one or more of (a) to (d) above, and selecting the best performing configurations of the hashing engine for implementation in cache logic.

For example, taking (a), an optimal allocation of bits may be determined by making an initial allocation of bits to each substitution unit, iteratively introducing modifications to the allocation and testing the effect of that modification on the performance of the cache logic in order to identify whether that modification should be maintained. In this manner an optimal allocation of bits to the substitution units may be approached without exhaustively evaluating all of the possible bit allocations to the substitution units for all of the possible combinations of substitution tables at the substitution units of the hashing engine (which would typically be an unfeasibly large amount of processing to perform).

As mentioned above, for substitution units of a hashing engine which use the same bit width, it can be advantageous to use different substitution sets so that the substitution units perform different substitutions for a given set of binary inputs. This can help to avoid aliasing problems in the cache logic which, in some configurations, can result due to the subsequent combination of bits derived from the binary outputs of the substitution units at the combination logic (e.g. where substitution sets are re-used at different substitution units the use of XORs at combination logic can inject linear character into the combinations of S-bit groups from the mapping unit when in fact it is desired that the substitution sets in use at the substitution units are non-linear with respect to one another).

For instance, independently-derived substitution sets could be used at substitution units having the same bit width, or different substitution sets could be derived for use at each such substitution unit from a common substitution set. One possible way of deriving different substitution sets from an initial substitution set without affecting its "good" characteristics is to rotate the sequence of bit substitutions defined at the set. For example, in the set of 3-bit substitutions set out above, a different substitution unit could be configured to use the same 3-bit substitutions but with each substitution rotated by 1 so that "000"=>"110", "001"=>"111", "010"=>"010", etc.

In order to avoid aliasing problems, it can be beneficial to use rotations of a common substitution set at different substitution units of the same width in cases where the bit width means that the outputs of the substitution units will go evenly into S-bit groups:

$$N \bmod S = 0$$

where N is the bit width of the substitution units concerned. This avoids linear combinations of the same substitution set being generated at the bit reduction logic if the binary outputs 306 are grouped together in contiguous blocks to form the S-bit groups 303 (since this would result in the outputs generated from the same substitution set spanning more than one S-bit group).

Alternatively, different N-bit substitution units, assuming these are linearly independent, may instead be derived using the process described above, and used instead of the rotation scheme.

In cache logic 100 configured as described herein, because the bit substitutions and combinations performed at the hashing engine have been optimised at design time, cache line addresses generated at the cache logic will be well-distributed over the cache memory 110. This is however achieved at minimal run-time processing cost because performing N-bit substitutions, at least for small values of N, is fast and cheap in terms of processing power, and the bit combinations performed at the mapping unit and combination logic may be achieved through the use of hardwiring (which has no processing cost) and fast, low-complexity hardware such as XORs.

More complex configurations are envisaged where a larger number of substitution units are provided than required by the T tag bits. In such embodiments, bits from a substitution unit which are not used to substitute bits of a binary input 305 may be used to select between substitution units according to some predefined scheme. This can help to further improve the performance of the cache logic at little additional run-time processing cost. In some embodiments, the bit width of the binary output from a substitution unit may be different to the bit width of its binary input—this could be useful, for example, in order to provide enough bits to create an integer number of S-bit groups.

Although shown as separate units in FIG. 3, the substitution units, mapping unit and combination logic may be integrated into a single logical unit configured to perform the defined substitutions, derive S-bit binary strings from the substituted bits and combine those S-bit strings with an S-bit input from the cache address input.

The binary strings 303 generated by the hashing engine 106 are combined at combination logic 309 with set bit sequence 103 from the input string 101 by means of a reversible operation, such as a bitwise XOR operation. In other examples this reversible operation could be another reversible operation, such as addition or subtraction modulo $2^S$. An XOR operation is straightforward and fast to implement in logic. Furthermore, by combining the binary strings 303 (which are generated in dependence on the tag bits 102 of the input memory address 101) with the set bits 103 of the input memory address 101, and through appropriate choice of the tag and set bits, it can be ensured that common accesses to sequential memory addresses are not stored at the same cache line.

A hashing engine configured in accordance with the examples described herein effectively embodies a simple hashing function, which is fast enough to be used in the critical path and does not significantly increase the complexity or power consumption of a cache memory. The hashing engine 106 also ensures that sequences of data having regular patterns of input memory addresses are distributed across the cache memory 110.

Typically, a cache memory system will have more than one cache bank. In FIG. 1 there are two cache banks, 111 and 112. Cache entries can be distributed between these memory banks by a bank selection unit 109. In some embodiments, the bank selection unit 109 is a bitwise operator that receives the least significant bit (121) of cache row 116 and combines that bit with a "bank" bit 104 from input memory address 101 (preferably the bit adjacent to but less significant than set bits 103). The bitwise operator 109, which in the example shown in FIG. 1 is a XOR, provides a bank indicator 122 at its output so as to direct input data 114 to the cache row 116 of one of the two cache banks 111 or 112. In this manner, cache entries are distributed between the cache banks and the advantages of multibank caches can be realised. If there are more than two cache banks, the number of least significant bits from cache address 116 and the (equal) number of bank bits is increased as appropriate (e.g. for four banks, two bank bits would be required).

The cache logic 100 may further comprise a bank scramble unit 108 which is configured to provide an input (e.g. a pseudorandom input) to the bank selection unit 109 in place of bits from the cache row 116. The least significant bit(s) from the cache row 116 may be used as a lookup into a bit register of the bank scramble unit 108 storing a bit sequence (e.g. a pseudorandom bit sequence) for which the likelihood that a lookup will return any of the possible values is substantially the same for all of the possible values. The output of the bank scramble unit 109 in the example shown in FIG. 1 has a width of 1 bit but would in general match the number of bits B of the bank bits 104, with there being a corresponding number of XORs 109 to combine the output of the bank scramble unit with the bank bits.

Figure 2:
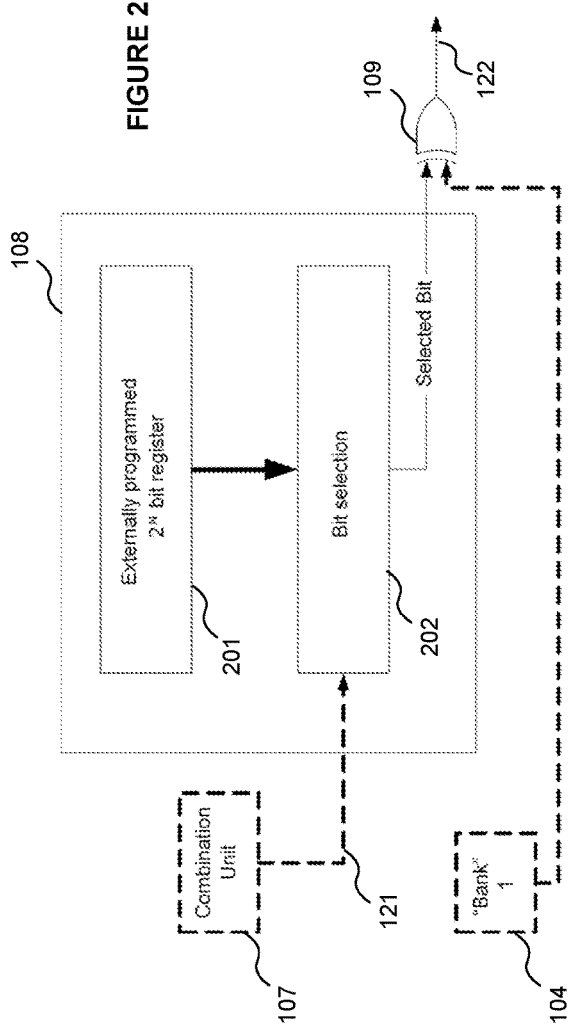
FIG. 2 is a schematic diagram of a possible implementation of a bank scramble unit.

An example bank scramble unit 108 is shown in more detail in FIG. 2 and comprises a bit register 201 for storing a binary sequence, and a bit selection unit 202 for selecting one or more bits from the binary sequence. The bit register 201 and bit selection unit 202 could be provided by any suitable combination of logic and memory suitable for storing a binary string of the required length; the bit register and selection unit could for example be a single logic unit, or part of a larger logic unit. In the example shown in FIG. 2, the bank scramble unit is configured to select between two banks. In the general case that there are B banks, the bit register 201 may be a $B*2^N$ bit register.

The bank scramble unit 108 could store a fixed binary sequence or could generate its own pseudorandom sequence of bits for use as the binary sequence according to any suitable technique known in the art. Preferably however, bit register 201 is programmable by an external agent such as a software or hardware functionality of a host computer at which the cache logic 100 is supported. This avoids increasing the complexity of the cache logic and leverages the processing power typically available at other parts of the data processing system in which the cache logic is implemented in order to form the binary string. Typically the bit register 201 would be initialised by a system driver on system reset or on power-up of the system.

The binary string stored at the bit register 201 may be randomly generated. However, preferably, an equal number of all of the possible values are inserted into positions of the binary string and then the values are shuffled within the binary string, such that the probability that a lookup from the binary string will return any of the possible values is substantially the same for all of the possible values. However the binary string is generated, it preferably has the property that if a group of B bits (e.g. B=1 in the examples described in detail above) is read from the binary string at any point within the binary string then the likelihood of reading any of the possible $2^B$ is substantially the same. For example, if B=1 then it is preferable that around half of the bits of the binary string are zero so that the bank scramble unit is approximately equally likely to select each bank of the cache memory. This can be achieved by randomly generating a binary string and then discarding generated binary strings that do not satisfy this condition until a binary string is generated that does satisfy the condition. The condition can be enforced in one example by only storing binary strings at the bit register that have between 40-60% zeros, or in another example by only storing binary strings at the bit register that have between 45 and 55% zeros. Alternatively, for examples in which B>1, a Gray code sequence could be used for the binary string, such that the binary string cycles through all the possible values. The way in which the binary string is formed may depend on the order in which data is accessed.

The bank scramble unit 108 may be configured to use one or more least significant bits 121 of the cache row 116 as a lookup into the binary string stored at the bit register 201. This arrangement means that bits of the cache address are not used in the bank selection unit 109 but rather provide a means by which bits are chosen from a (e.g. pseudorandom) binary string by the bank scramble unit 108. Least significant bits 121 may be used as a lookup into bit register 201 by selection unit 202 in the manner appropriate to the architecture of the bit register employed in the bank scramble unit. For example, the least significant bits could be used to identify a bit position in the bit register or as a seed for an algorithm arranged to choose one or more bits from the bit register.

In alternative examples, the bank scramble unit 108 may comprise one or more substitution units configured according to the principles described herein so as to map the S-bit output 121 from the hashing engine 106 to a B-bit output.

In preferred embodiments, the bit register is $2^M$ bits in length, where M is the number of least significant bits 121 of the cache address 116. This allows the least significant bits 121 to be used as an address identifying a bit position in the binary string stored in the register 201. For example, if M=5 then the binary string at the bit register is 32 bits long, with the 5 bit string of the least significant bits 121 of a given cache address identifying a particular bit of the binary string. The number of bits required for the bank selection unit 109 are selected in sequence starting from that particular bit in the bit register 201 (e.g. for a cache memory having two cache banks, just the identified bit is selected; for four cache banks two bits are selected).

The one or more bits selected by selection unit 202 from the bit register 201 are provided to bank selection unit 109 for combination with the one or more bank bits 104 in the manner described above. The bank selection unit 109 (which is preferably a XOR operator) generates bank indicator 122 so as to identify a cache bank at which the data and the tag bits 102 are to be stored.

The use of the bank scramble unit 108 acts to distribute the accesses to the banks by the cache system. Since the binary sequence stored in the register 201 may be selected to have pseudorandom characteristics (whilst preferably ensuring that around 50% of the bits are zeros), the bank scramble unit 108 generally provides better performance than mixing bit(s) of the cache row indicator 121 with bank bit(s) 104. This is because the bank selection made by the bank scramble unit is essentially decoupled from the particular sequence of bits present in the memory address 101 and is therefore less likely to result in pathological access patterns between the cache banks. The bank scramble unit 108 can be effectively disabled by setting all of the bits of the bit register 201 to zeros, or all of the bits to ones.

Note that the use of a XOR as the bank selection unit 109 ensures that, in the case of burst transfers of data, pairs of aligned $2^W$ byte reads will still read from/write to alternate banks and hence provide the associated performance benefits. That is, for two memory adjacent addresses which have the same tag and set bits but different bank bits, the cache row indication 116 output from the combination logic 309 will be the same, but the cache bank indicator output from the bank selection unit 109 will be different. For other read/write patterns (for which the tag and/or set bits changed between two memory addresses, e.g. if the set bits are increased by one), the cache accesses will be well distributed amongst the banks 111 and 112, thus avoiding pathological access cases. It is noted that, the hashing of the tag bits and the bank scrambling are deterministic processes in the sense that a given memory address 101 will map to the same cache address if the cache mapping is repeated.

Typically only part of the input memory address 101 is used as tag and set bits, with the lowest significant bits being unused by the cache logic and represented by word bits 105 in FIG. 1. In order to allow an input memory address to be recreated from the cache memory, not all of its bits need to be stored in the cache. This is because, on reading an entry from the cache:

a) the value of the bank indicator bit(s) 122 and the cache row indicator bits 116 can be derived since it is known where in the cache the entry was read from. The least significant bits of the cache row indicator can be passed through the bank scramble unit 108 (or an equivalent unit), and the result can be used as an input to an XOR operation, which has the bank indicator bit(s) as another input to thereby find the bank bit(s) of the memory address.

b) the set bits can be readily calculated from the cache row indicator bits 116 because the operation performed at the combination logic 309 is reversible. The tag is stored in the cache and can be, for example, pushed through the hashing engine again (or an equivalent unit) so as to reveal the bits that must have been combined with the set bits to form the cache row address. Since the output of the combination logic is known (the cache row indicator bits) and one of the inputs to the combination logic can be determined from the tag bits retrieved from the cache, the other input to the combination logic 309, i.e. the set bits 103, can be determined because the operation performed at the combination logic 309 is reversible. In other words, the tag bits can be passed through the substitution units 301 and mapping unit 302 in the same manner as described above in order to determine the S-bit inputs 303. Then using the inputs 303 and the S-bit output 116 (identified from the cache row) the combination logic 309 can determine the S-bit input 103 using the operation that reverses the reversible operation that was used to determine the output bits 116 as described above.

Thus, the information content of a binary input memory address can be stored at cache memory 110 by storing only the tag bits 102 of the memory address 101 along with the data itself which is of length $2^W$. The word bits are determined by the byte-position in the cache line at which the data was stored.

Although the embodiments have referred to caching data stored in memory, a cache could be used for other operations. For example, given an expensive, but frequently computed function, $f: X \rightarrow Y$, it could be used to store results, say, of recent computations. In such a situation, the values of X would take the place of the address in the cache lookup.

Cache logic configured in accordance with the present invention could comprise one or more of, for example, dedicated hardware logic, suitably programmed reconfigurable logic (e.g. an FPGA), and/or a processor executing code configured such as to cause, the combination of processor and code to provide the functionalities of the invention described herein (such as an ASIC or FPGA). In preferred embodiments the cache logic is a hardwired logic unit.

The claimed functionalities of the cache logic (e.g. the hashing engine, combination logic, bank selection unit and bank scramble unit) need not be provided as discrete units and represent functionalities that could (a) be combined in any manner, and (b) themselves comprise one or more logic units.

The term random is used herein to refer to both truly random and pseudo-random numbers, processes, selections, generations, etc.

The cache logic, bank scramble unit and hashing engine of FIGS. 1-3 are shown as comprising a number of functional blocks. This is schematic only and is not intended to define a strict division between different logic elements of such entities. Each functional block may be provided in any suitable manner. It is to be understood that intermediate values described herein as being formed by a cache logic, bank scramble unit or hashing engine need not be physically generated at any point and may merely represent logical values which conveniently describe the processing performed by the cache logic, bank scramble unit or hashing engine between its input and output.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

Code defining an integrated circuit may define an integrated circuit in any manner, including as a netlist, code for configuring a programmable chip, and as a hardware description language defining an integrated circuit at any level, including as register transfer level (RTL) code, as high-level circuit representations such as Verilog or VHDL, and as low-level circuit representations such as OASIS and GDSII. When processed at a suitably equipped computer system configured for generating a manifestation of an integrated circuit, code defining an integrated circuit may cause the computer system to generate a manifestation of the integrated circuit expressed by the code. Such computer systems may cause a manifestation of an integrated circuit to be generated by, for example, providing an output for controlling a machine configured to fabricate an integrated circuit or to fabricate an intermediate expression of the integrated circuit, such as a lithographic mask.

Higher level representations which logically define an integrated circuit (such as RTL) may be processed at a computer system configured for generating a manifestation of an integrated circuit in the context of a software environment comprising definitions of circuit elements and rules for combining those elements in order to generate the manifestation of an integrated circuit so defined by the representation.

Those skilled in the art will also realize that all, or a portion of the functionality, techniques or methods described herein may be carried out by a dedicated circuit, an application-specific integrated circuit, a programmable logic array, a field-programmable gate array, or the like. For example, the module, functionality, component, unit or logic (e.g. the components of hashing engine 106) may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component, unit or logic (e.g. the components of hashing engine 106) may include circuitry that is fixed function and circuitry that can be programmed to perform a function or functions; such programming may be provided from a firmware or software update or control mechanism. In an example, hardware logic has circuitry that implements a fixed function operation, state machine or process.

Figure 5:
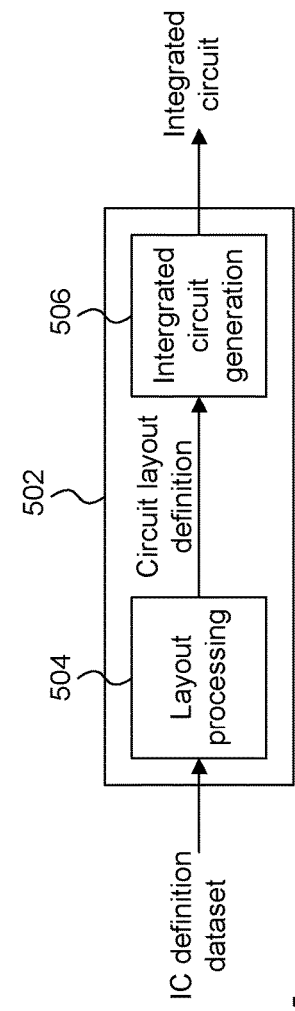
FIG. 5 is a schematic diagram of an integrated circuit manufacturing system.

It is also intended to encompass software which "describes" or defines the configuration of hardware that implements a module, functionality, component, unit or logic (e.g. the components of hashing engine 106) described above, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture cache logic as described herein. The IC definition dataset may be in the form of computer code, e.g. written in a suitable HDL such as register-transfer level (RTL) code. FIG. 5 shows an example of an integrated circuit (IC) manufacturing system 502 which comprises a layout processing system 504 and an integrated circuit generation system 506. The IC manufacturing system 502 is configured to receive an IC definition dataset (e.g. defining cache logic as described in any of the examples herein), process the IC definition dataset, and generate an IC according to the IC definition dataset (e.g. which embodies cache logic as described in any of the examples herein). The processing of the IC definition dataset configures the IC manufacturing system 502 to manufacture an integrated circuit embodying cache logic as described in any of the examples herein. More specifically, the layout processing system 504 is configured to receive and process the IC definition dataset to determine a circuit layout.

Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 504 has determined the circuit layout it may output a circuit layout definition to the IC generation system 506. The IC generation system 506 generates an IC according to the circuit layout definition, as is known in the art. For example, the IC generation system 506 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 506 may be in the form of computer-readable code which the IC generation system 506 can use to form a suitable mask for use in generating an IC. The different processes performed by the IC manufacturing system 502 may be implemented all in one location, e.g. by one party. Alternatively, the IC manufacturing system 502 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. Cache logic for generating a cache address from a binary memory address comprising a first binary sequence of a first predefined length and a second binary sequence of a second predefined length, the cache logic comprising:
   a plurality of substitution units each configured to receive a respective allocation of bits of the first binary sequence and to replace its allocated bits with a corresponding substitute bit string selected in dependence on the received allocation of bits;
   a mapping unit configured to combine the substitute bit strings output by the substitution units so as to form one or more binary strings of the second predefined length; and
   combination logic arranged to combine the one or more binary strings with the second binary sequence by a reversible operation so as to form a binary output string for use as at least part of a cache address in a cache memory.

2. Cache logic as claimed in claim 1, wherein each of the substitution units comprises a lookup table defining the substitute bit strings and the binary inputs to which each corresponds, the respective allocation of bits for the substitution unit being used as a lookup into its lookup table.

3. Cache logic as claimed in claim 1, wherein the substitute bit strings stored at each substitution unit are pre-calculated from a set of possible substitute bit strings so as to minimise a correlation between the set of possible binary inputs of the substitution unit and the respective substitute bit strings.

4. Cache logic as claimed in claim 3, wherein the substitute bit strings stored at each substitution unit are pre-calculated from the set of possible substitute bit strings so as to further minimise the correlation between linear combinations of the set of possible binary inputs of the substitution unit and the respective substitute bit strings.

5. Cache logic as claimed in claim 1, wherein the plurality of substitution units comprise more than one substitution unit having the same bit width, those substitution units having the same bit width each having a different set of substitute bit strings.

6. Cache logic as claimed in claim 5, wherein the sets of substitute bit strings at the substitution units having the same bit width share the same order of substitute bit strings in each set, each set of substitute bit strings being related to the other by a rotation of the substitute bit strings relative to the possible binary inputs of the substitution units.

7. Cache logic as claimed in claim 1, wherein one or more of the plurality of substitution units receive fewer input bits than the number of bits present in each of its substitute bit strings, those substitution units being configured to fix the value of its empty input(s) at some predefined bit value or to interpret its empty input(s) as having bit values according to some predefined scheme.

8. Cache logic as claimed in claim 1, wherein the mapping unit comprises a set of physical connections defining mappings between the output bits from the substitution units to the bits of the one or more binary strings of the second predefined length.

9. Cache logic as claimed in claim 1, wherein the combination logic comprises bit reduction logic and output logic, the bit reduction logic being configured to reduce the one or more binary strings to an intermediate binary string of the second predefined length, and the output logic being configured to combine the intermediate binary string with the second binary sequence by a bitwise reversible operation so as to form the binary output string.

10. Cache logic as claimed in claim 1, wherein the first binary sequence is a predetermined sequence of the most significant bits of the binary memory address.

11. Cache logic as claimed in claim 10, wherein the second binary sequence is a predetermined sequence of less significant bits of the binary memory address.

12. Cache logic as claimed in claim 1, wherein the reversible operation performed at the combination logic comprises one or more bitwise XOR operations.

13. Cache logic as claimed in claim 1, further comprising a bank selection unit configured to combine one or more bits derived from the binary output string with an equal number of bits of the binary memory address by means of a second bitwise operation so as to generate a bank identifier for identifying a bank in a cache memory having a plurality of cache banks.

14. Cache logic as claimed in claim 13, wherein the one or more bits of the binary memory address are less significant bits than the bits of the second binary sequence.

15. Cache logic as claimed in claim 13, further comprising a bank scramble unit having a bit register configured to store a predetermined binary string, the bank scramble unit being configured to operate on the one or more bits of the binary output string by using a sequence of one or more bits from the binary output string as a lookup in the bit register so as to select a predetermined number of bits from the stored predetermined binary string for use as the one or more bits derived from the binary output string in the bank selection unit, wherein the predetermined binary string has the property that the value of the selected bits has substantially the same likelihood of being any of the possible values.

16. Cache logic as claimed in claim 15, wherein the predetermined binary string is $2^M$ bits long and the predetermined sequence of bits from the binary output string is the M least significant bits of the binary output string, the bank scramble unit being configured to use the M least significant bits of the binary output string as a bit address in the predetermined binary string from which to read the predetermined number of bits from the stored predetermined binary string.

17. A method for generating a cache address from a binary memory address comprising a first binary sequence of a first predefined length and a second binary sequence of a second predefined length, the method being performed at cache logic, the method comprising:
   allocating bits of the first binary sequence to each of a plurality of substitution units of the cache logic;

at each of the substitution units, using the allocated bits of the first binary sequence to determine a corresponding substitute bit string and replacing the allocated bits with that substitute bit string;

transforming the plurality of substitute bit strings from the plurality of substitution units into one or more binary strings of the second predefined length; and combining the one or more binary strings with the second binary sequence by a reversible operation so as to form a binary output string for use as at least part of a cache address in a cache memory.

18. A method as claimed in claim 17, the using the allocated bits of the first binary sequence to determine a corresponding substitute bit string comprising using the allocated bits of the first binary sequence as a lookup into a lookup table of the substitution unit.

19. A method as claimed in claim 17, wherein the combining comprises reducing the one or more binary strings of the second predefined length to an intermediate binary string of the second predefined length, and combining the intermediate binary string with the second binary sequence by a bitwise reversible operation so as to form the binary output string.

20. A non-transitory computer readable storage medium having stored thereon a computer readable description of an integrated circuit that, when processed in an integrated circuit manufacturing system, causes the integrated circuit manufacturing system to manufacture cache logic embodied in hardware on an integrated circuit, the cache logic being for generating a cache address from a binary memory address comprising a first binary sequence of a first predefined length and a second binary sequence of a second predefined length, and the cache logic comprising:

a plurality of substitution units each configured to receive a respective allocation of bits of the first binary sequence and to replace its allocated bits with a corresponding substitute bit string selected in dependence on the received allocation of bits;

a mapping unit configured to combine the substitute bit strings output by the substitution units so as to form one or more binary strings of the second predefined length; and combination logic arranged to combine the one or more binary strings with the second binary sequence by a reversible operation so as to form a binary output string for use as at least part of a cache address in a cache memory.

\* \* \* \* \*